(12) United States Patent
Glynn

(10) Patent No.: US 8,171,928 B2
(45) Date of Patent: May 8, 2012

(54) RECIPROCATING SOLAR ENGINE

(76) Inventor: Kenneth P. Glynn, Flemington, NJ (US)

( * ) Notice: Subject to any disclaimer, the term of this patent is extended or adjusted under 35 U.S.C. 154(b) by 370 days.

(21) Appl. No.: 12/319,248

(22) Filed: Jan. 5, 2009

(65) Prior Publication Data

US 2010/0170497 A1    Jul. 8, 2010

(51) Int. Cl.
- *F24J 2/46* (2006.01)
- *F24J 2/38* (2006.01)
- *F01K 7/00* (2006.01)
- *F03C 1/00* (2006.01)
- *F03B 13/00* (2006.01)

(52) U.S. Cl. ............. 126/571; 126/604; 60/531; 290/54
(58) Field of Classification Search ................ 126/572, 126/604; 60/531, 675; 290/54
See application file for complete search history.

(56) References Cited

U.S. PATENT DOCUMENTS

| | | | |
|---|---|---|---|
| 253,868 A * | 2/1882 | Iske et al. | 60/675 |
| 2,999,943 A * | 9/1961 | Geer | 250/215 |
| 3,029,806 A * | 4/1962 | Okuda | 126/626 |
| 3,635,015 A * | 1/1972 | Samuels | 60/530 |
| 3,846,984 A * | 11/1974 | Siegel | 60/509 |
| 4,079,249 A | 3/1978 | Glynn | |
| 4,132,223 A | 1/1979 | Reddell | |
| 4,175,391 A | 11/1979 | Baer | |
| 4,194,492 A | 3/1980 | Tremblay | |
| 4,275,712 A | 6/1981 | Baer | |
| 4,476,854 A | 10/1984 | Baer | |
| 2003/0192315 A1 * | 10/2003 | Corcoran | 60/645 |
| 2010/0180594 A1 * | 7/2010 | Glynn | 60/641.15 |

* cited by examiner

*Primary Examiner* — Kenneth Rinehart
*Assistant Examiner* — William Corboy
(74) *Attorney, Agent, or Firm* — Kenneth P. Glynn, Esq.; Deirdra M. Meagher, Esq.

(57) ABSTRACT

A reciprocating solar engine includes a) a seesawing platform having a central fulcrum support upon which the platform is moveably positioned to reciprocally rotate through a predetermined arc b) a first solar heat-receiving closed container located on the platform on one side of the support and a second solar heat-receiving closed container located on the platform on a second side of the support; c) a connecting tube connecting the first container and the second container; d) a fluid contained within at least one of the first and the second container, the fluid being evaporable from solar heat and condensable from shading from solar heat; e) a roof above the platform, having at least one window of which is located above the first container and at least one window of above the second container; f) shuttering devices connected to the roof and movable so that one window is closed while the other is open and vice versa; and, g) shutter device controls functionally connected to the shutter device and the platform such that the shutter device controls activate the shutter devices to a first rest position when the second solar heat-receiving closed container is at its arc base, and to the second rest position when the first solar heat-receiving closed container is at its arc base.

17 Claims, 14 Drawing Sheets

RECIPROCATING SOLAR ENGINE

BACKGROUND OF INVENTION a. Field of Invention

The invention relates generally to a reciprocating solar engine that is based on material transfer back and forth across a fulcrum utilizing solar energy to cause the material transfer. The present invention reciprocating solar engine may be used as a driving force for any purpose, e.g. turning a turbine to generate electricity, operating a pump to move liquid such as water, operating reciprocating pistons, or turning a production wheel.

b. Description of Related Art

The following patents are representative of the field pertaining to the present invention:

U.S. Pat. No. 4,476,854 to Stephen C. Baer describes an apparatus for tracking the sun which reorients itself immediately in the absence of sunlight. Large and small cannisters are provided at the respective ends of a pivotable frame. When the sun is not normal to the plane containing the cannister, the near cannister is shaded from direct sunlight and the far cannister is exposed. A conduit is provided between the cannisters, and a quantity of volatile fluid is located in the cannisters and conduit. The liquid volume of the volatile fluid is greater than that of the small cannister plus the conduit, but less than the volume of the large cannister. A gas spring fluid is located in the large cannister, which has a vapor pressure sufficient to force the volatile fluid into the small cannister in the absence of sunlight on the east cannister.

U.S. Pat. No. 4,275,712 to Stephen C. Baer describes a device for rotating a collector of solar energy in such a way as to keep it constantly oriented during the day in the best direction for interception of radiation and for returning it to a position from which it will begin collecting radiation again in the morning. Whereas a previously disclosed device for automatic return to morning position relies upon changing the rate of heat loss from the surfaces of the interconnected canisters which power it, the present invention removes the heat-collecting surfaces whose differential heating by the west-moving sun controls the tilting of the collector from the canisters themselves to plates located below and on sides opposite the canisters served so as to give these surfaces a larger view of the sky and enable them to find the sun from almost any position.

U.S. Pat. No. 4,194,492 to Gerald J. Tremblay describes a solar fluid heater that has a frame and a solar collector for collecting and concentrating solar energy movably mounted on the frame. An inclination adjustment system is attached for rotating the solar collector for different inclinations of the earth relative to the sun, and a solar tracking system moves the solar collector in a different direction on the frame during daylight hours responsive to the flow of liquid from a reservoir mounted thereon to track the sun during daylight hours.

U.S. Pat. No. 4,175,391 to Stephen Baer describes an apparatus for causing a solar energy collector to constantly follow the sun by using solar radiant energy to differentially heat fluid-containing reservoirs to cause differential vaporization and shifting of fluid to rotate the apparatus. Automatic morning orientation is included by providing the easterly reservoir with a faster rate of cooling than the westerly one thereby causing shift of fluid from westerly to easterly after sunset resulting in inclination toward the east by sunrise.

U.S. Pat. No. 4,132,223 to E. Garland Reddell describes a pivotally mounted solar energy collector is maintained oriented towards the sun by creating a continuing imbalance of the collector about its pivotal axis resulting in pivotal movement of the collector to track the sun. The imbalance is achieved by regulating the flow of a pumped fluid from a container located at one side of the collector to a container located at another side of the collector. Pump, timing and energizing means are included to control the flow rate of the fluid.

U.S. Pat. No. 4,079,249 to Kenneth P. Glynn describes a motor apparatus described for orientating solar responsive devices. The motor apparatus is solar energy operated and comprises a plurality of containers connected in closed systems having fluid therein, support means for the containers including rotatable parts, and a solar window-containing component which permits solar energy to strike surfaces of the containers so as to change the distribution of fluid in the systems to cause the rotatable parts, and thus an attached solar responsive device, to rotate, e.g., in an arc so as to follow the sun.

Notwithstanding the prior art, the present invention is neither taught nor rendered obvious thereby.

SUMMARY OF INVENTION

The present invention is a reciprocating solar engine, which includes a) a seesawing platform having a central fulcrum support upon which the platform is moveably positioned to reciprocally rotate through a predetermined arc, the predetermined arc having a bottom, the bottom being the arc base; b) a first solar heat-receiving closed container located on the platform on a first side of the central fulcrum support and a second solar heat-receiving closed container located on the platform on a second side of the central fulcrum support and opposite the first side; c) a connecting tube connected to the first solar heat-receiving closed container and to the second solar heat-receiving closed container; d) a fluid contained within at least one of the first solar heat-receiving closed container and the second solar heat-receiving closed container, the fluid being evaporable from solar heat and condensable from shading from solar heat; e) a roof located above the platform, the roof having at least two windows, at least one window of which is located above the first solar heat-receiving closed container and at least one window of which is located above the second solar heat-receiving closed container; f) shutter means connected to the roof and movably related to the at least two windows and functionally connected thereto, the shutter means having a first rest position and a second rest position, wherein in the first rest position, the at least one window above the first solar heat-receiving closed container is open and the at least one window above second solar heat-receiving closed container is closed, and wherein in the second rest position, the at least one window above the first solar heat-receiving closed container is closed and the at least one window above second solar heat-receiving closed container is open; and, g) shutter control means functionally connected to the shutter means and functionally connected to the platform such that the shutter control means activates the shutter to the first rest position when the second solar heat-receiving closed container is at its arc base, and to the second rest position when the first solar heat-receiving closed container is at its arc base.

The term "shutter means" should be taken broadly as any device that can open and close an area to significant sunlight. The term should not be limited literally to shutters, as it is intended to include any device that will shutter sunlight In some preferred embodiments of the present invention reciprocal solar engine, the shutter means in selected from the group consisting of a single sliding door, doors, shutters, screens and shades. Single sets of shutters, screens or shades or a plurality of these may be employed. If more than one window closure means, i.e., the shutter means, is utilized, then a critical feature is that they be functionally connected so that at least part of the time, one is open when the other is closed and vice versa, to present alternating sun and shade to the containers.

In some preferred embodiments of the present invention, instead of a roof with perhaps only supports, there is a housing having side walls and a roof, the roof being located at least above the platform, the roof having at least two windows, at least one window of which is located above the first solar heat-receiving closed container and at least one window of which is located above the second solar heat-receiving closed container.

In some preferred embodiments of the present invention reciprocal solar engine, the roof is a rectangular shaped roof from a top view. Any other shape could be employed, but for most practical applications, the shape of an open wall or housing similar to a home, shed, or building may be aesthetically and functionally easier to design and to view. (One of the advantages of the present invention over roof mounted solar panels or very tall wind turbines, is that they can be placed in a yard or field or lot and externally appear as a normal structure or br surrounded by trees or other attractive cover. Unlike wind turbines, the objectional height and noise issues are eliminated and unlike roof-mounted solar panels, roof support and appearance issues are eliminated.)

In some preferred embodiments of the present invention reciprocal solar engine, the shutter controls means in selected from the group consisting of motor drive control means, mechanical control means, hydraulic control means and pneumatic control means.

In some preferred embodiments of the present invention reciprocal solar engine, the first solar heat-receiving closed container and the second solar heat-receiving closed container are at least partially transparent containers.

In some preferred embodiments of the present invention reciprocal solar engine, the at least partially transparent containers have transparent tops and solar heat-absorbing bottoms.

In some preferred embodiments of the present invention reciprocal solar engine, the first solar heat-receiving closed container and the second solar heat-receiving closed container are selected from the group consisting of glass, metal, plastic, and combinations thereof.

In some preferred embodiments of the present invention reciprocal solar engine, the reciprocal solar engine includes a connecting member for transfer of motive power, connected to at least one of the platform and a container.

In some preferred embodiments of the present invention reciprocal solar engine, the connecting member is a shaft connected to the platform proximate its center and on its axis of rotation to function as an arcuate reciprocating drive shaft.

In some preferred embodiments of the present invention reciprocal solar engine, the at least two windows contain solar energy concentrating magnifying lenses.

Additional features, advantages, and embodiments of the invention may be set forth or apparent from consideration of the following detailed description, drawings, and claims. Moreover, it is to be understood that both the foregoing summary of the invention and the following detailed description are exemplary and intended to provide further explanation without limiting the scope of the invention as claimed.

BRIEF DESCRIPTION OF THE DRAWINGS

The accompanying drawings, which are included to provide a further understanding of the invention and are incorporated in and constitute a part of this specification, illustrate preferred embodiments of the invention and together with the detail description serve to explain the principles of the invention. In the drawings.

DETAILED DESCRIPTION OF THE EMBODIMENTS

The present invention reciprocating solar engine is based on material transfer back and forth across a fulcrum utilizing solar energy to cause the material transfer. The material transfer occurs when solar energy heats a liquid in a container to cause some vaporization of the liquid, the vaporized liquid (gas) then condenses to liquid in a container on the opposite side of the fulcrum, and the weight shit causes mass to rotate about the fulcrum. The present invention reciprocating solar engine may be used as a driving force for any purpose, e.g. turning a turbine to generate electricity, operating a pump to move liquid such as water, operating reciprocating pistons, or turning a production wheel.

Figure 1:
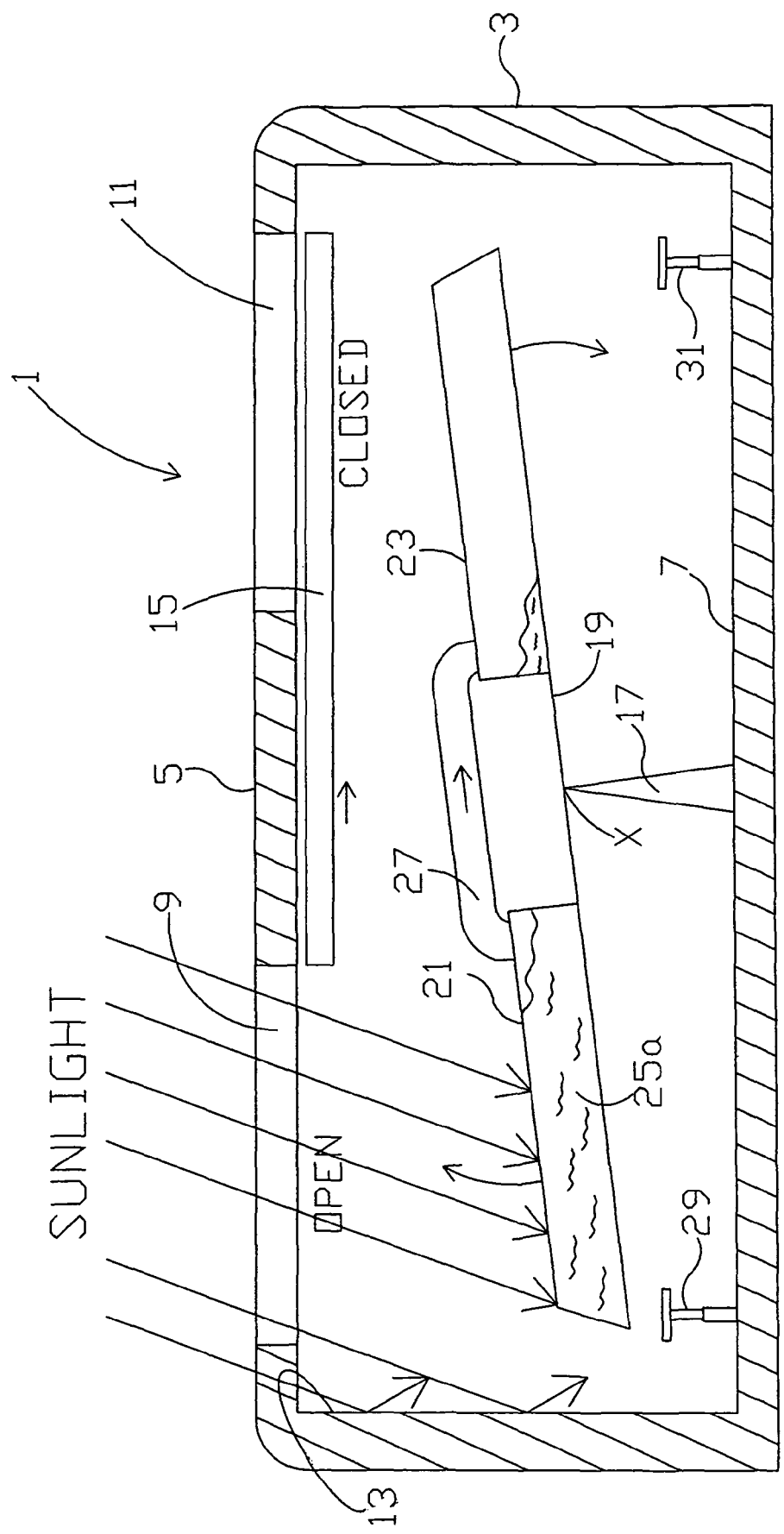
FIG. 1 is a side cut view of a preferred embodiment of a present invention reciprocating solar engine.

FIG. 1 is a side cut view of a preferred embodiment of a present invention reciprocating solar engine 1. Solar engine 1 includes a main housing 3 with a bottom 7 and side walls such as wall 13. Housing 3 also has a roof 5, with a first (left) window 9 and a second (right) window 11. The size and position of the windows are considered in conjunction with the solar heat-receiving closed containers. There is an elongated sun blocking shutter means, in this case single door 15. Door 15 is on sliders or tracks (not shown) and has a first rest position where window 9 is open and window 11 is closed, and a second rest position where window 9 is closed and window 11 is open. Within housing 3 is a central fulcrum support 17 and a platform 19 located atop central fulcrum support 17 so that platform 19 is rotatable on the central fulcrum support 17 about its axis of rotation shown as x in FIG. 1.

Positioned evenly on platform 19 are two solar heat-receiving closed containers. To the left of the central fulcrum support 17, on platform 19, is solar heat-receiving closed container 21 and to the right of the central fulcrum support 17, on platform 19, is solar heat-receiving closed container 23. There is a connecting means, in this case tube 27, that connects the two solar heat-receiving closed containers. They, along with platform 19, move up and down through a predetermined arc. The predetermined arc is defined by any one or more of a number of variables that my be included or are inherent in any given device. Thus, the predetermined arc is limited by the space in the housing 3 or, more specifically, the roof 5 of the housing 3, the height of the central fulcrum support 17 and the length of the platform 19. Beyond that, brakes, stops, gears, shutter controls or other features may represent a bottom or top of the predetermined arc.

Contained within at least one of the two solar heat-receiving closed containers is a fluid that is capable of being at least partially vaporized to gas by solar heat and will otherwise rest in equilibrium in the container(s), possibly with some of the fluid in the gaseous state before solar heat is applied. The connecting tube is open from the left to the right containers and vice versa for transport of the vaporized fluid from the warmer container (solar heated) to the cooler container, due to gases expanding and rising. Once in the cooler container (solar shaded), the gases will at least partially condense, shifting the fluid and hence the weight of the fluid from the warmer to the cooler container. When the shutter means closes a first window and opens a second window, it shuts off most of the solar heat at the first window and allows solar heat to enter through the second window.

Referring again more specifically to FIG. 1, window 9 is open and window 11 is closed by virtue of the positioning of door 15, as shown in the Figure. Sunlight enters window 9 and not window 11. As sunlight enters window 9, it heats up container 21 and fluid 25a starts to boil over through tube 27 to container 23 where it at least partially condenses. Eventually, the weight shift will cause the right side of platform 19 to go down and the left side to go up. This is rotation of the platform about its axis of rotation x. The process is followed in more detail in FIGS. 2 through 6, where identical elements are identically numbered.

Figure 2:
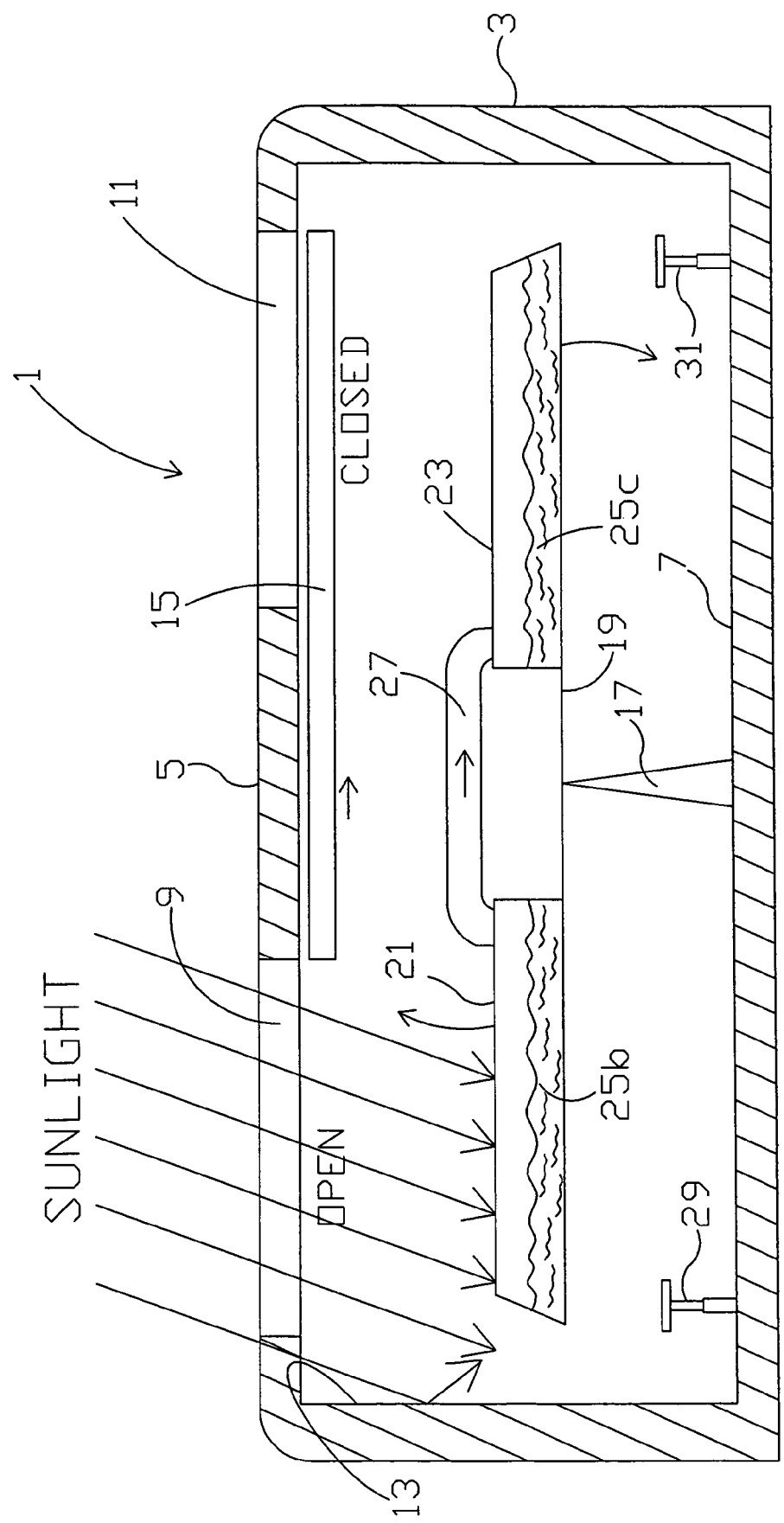
FIGS. 2 through 6 show side cut views of the preferred embodiment of a present invention reciprocating solar engine shown in FIG. 1, in different positions of a reciprocal cycle.
Figure 3:
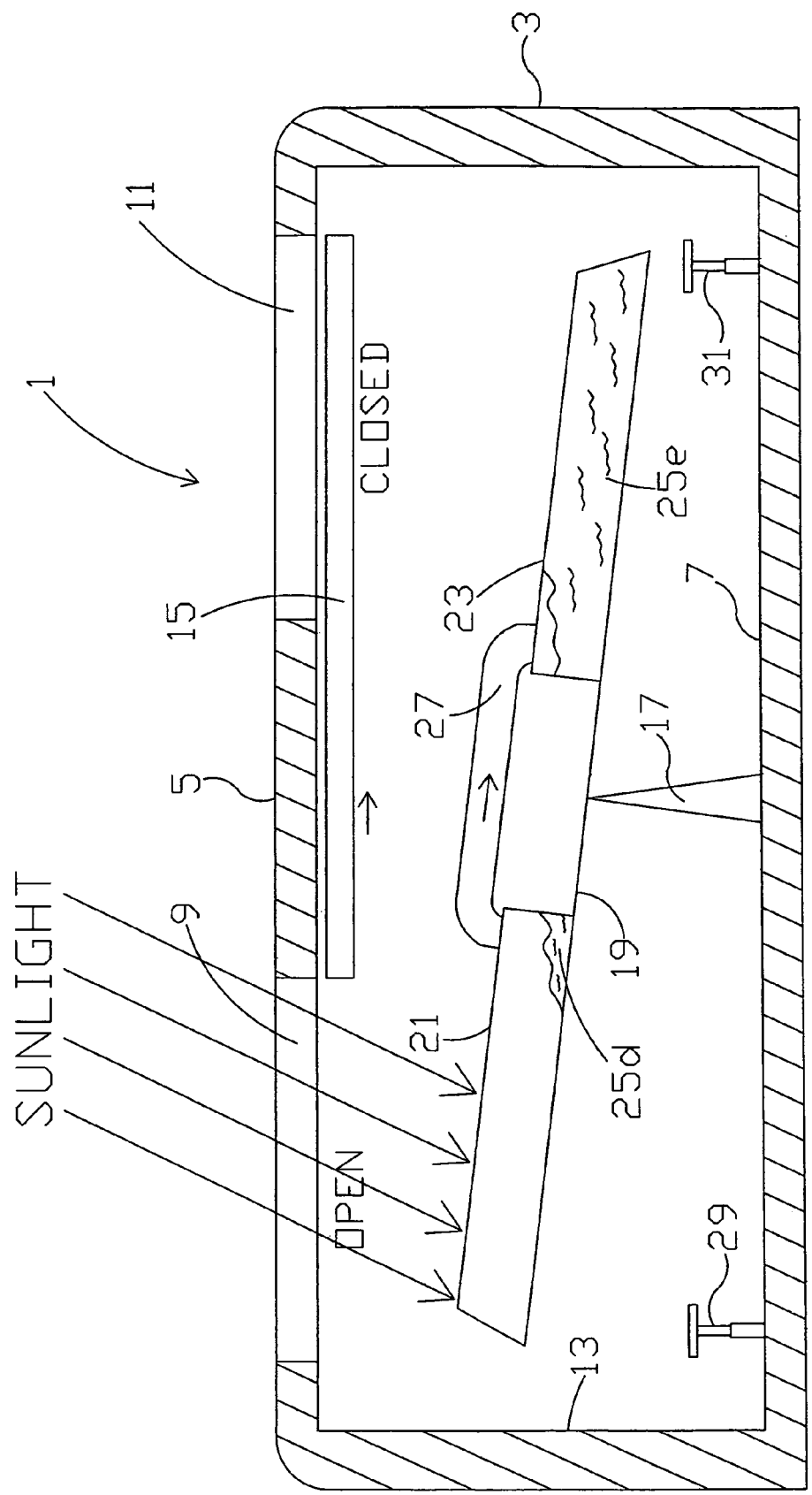
Figure 4:
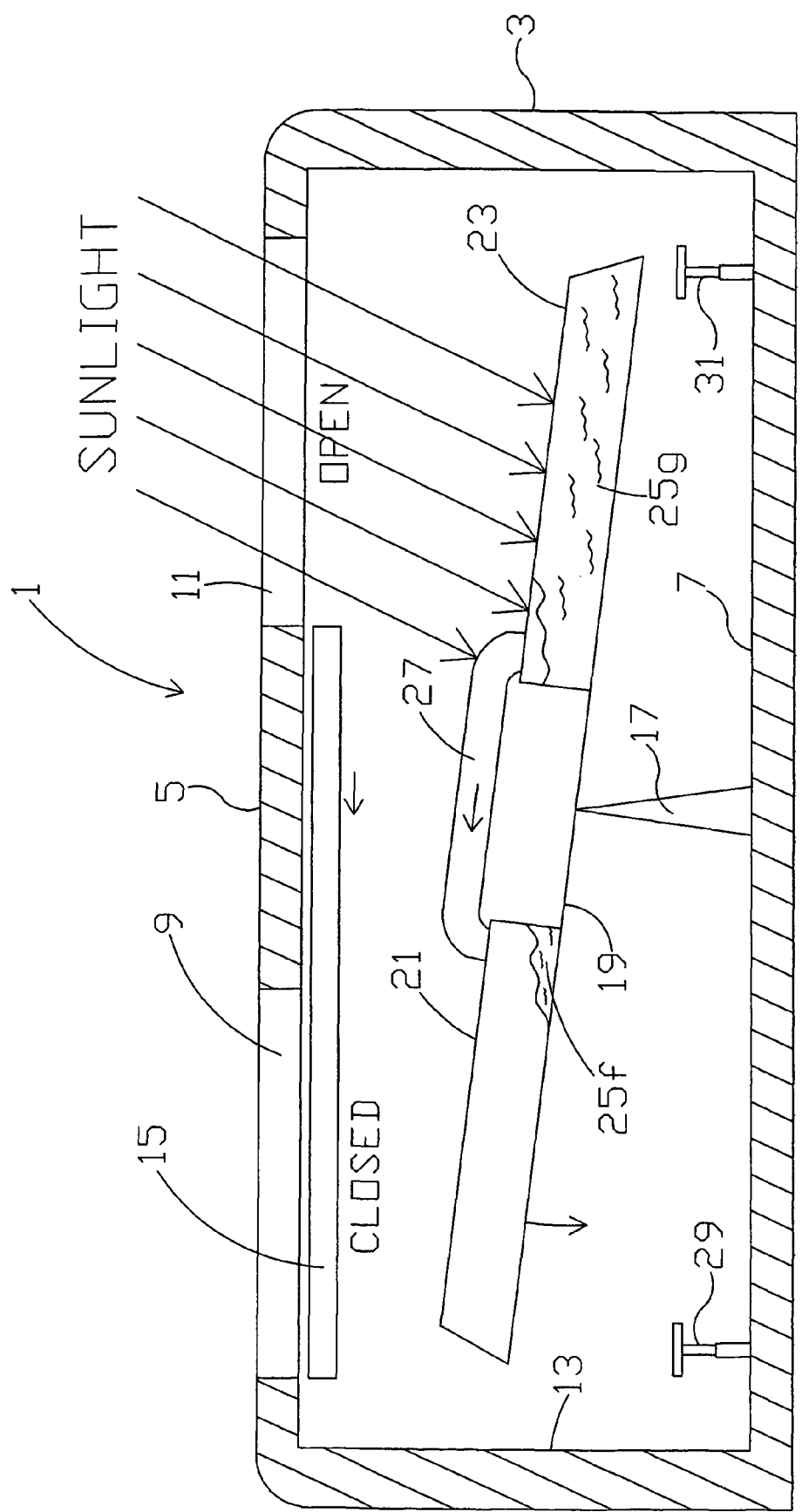
Figure 5:
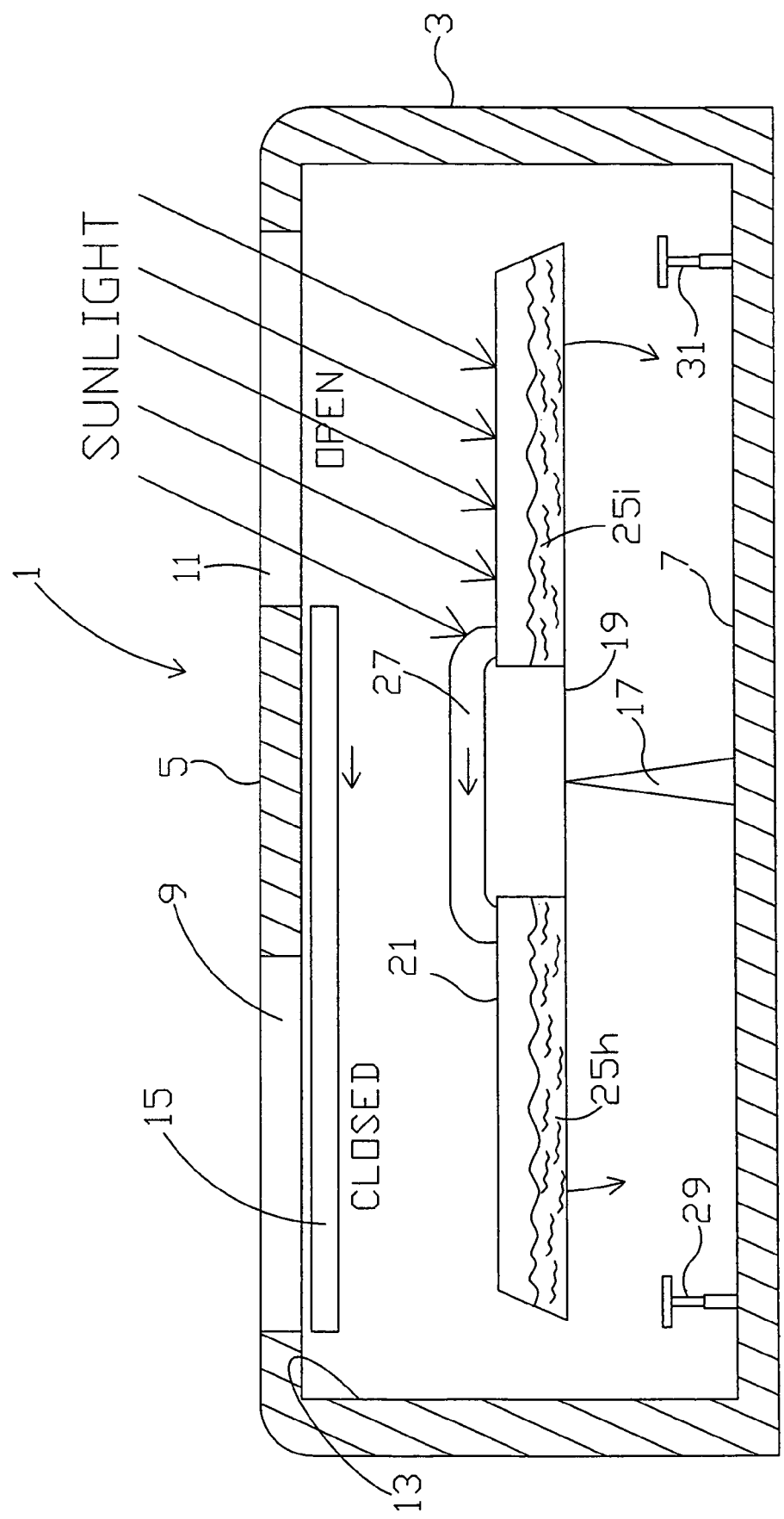
Figure 6:
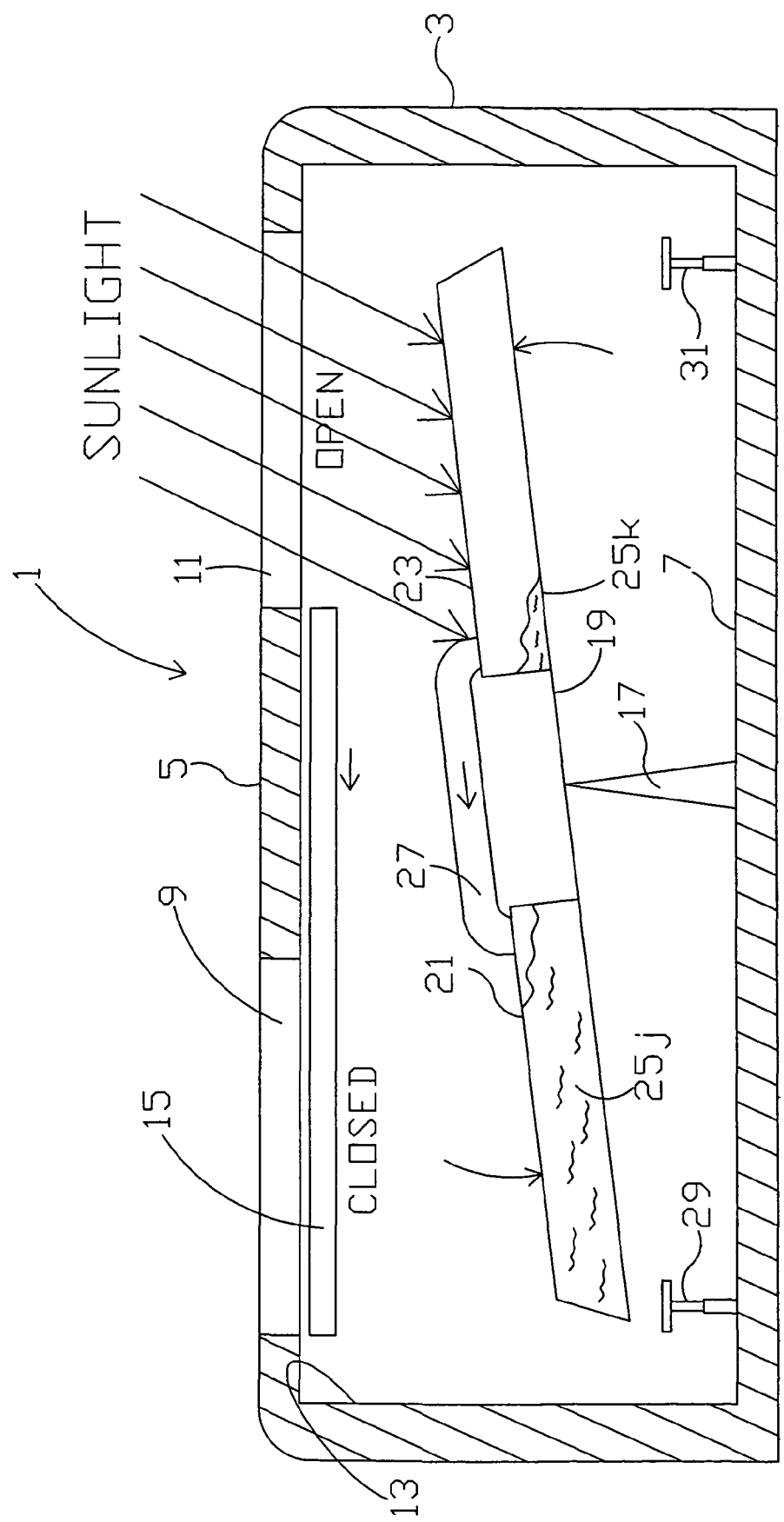

Thus, FIGS. 2 through 6 show side cut views of the preferred embodiment present invention reciprocating solar engine 1 shown in FIG. 1, but in different positions of a reciprocal cycle. In FIG. 2, sunlight through window 9 continues to evaporate the fluid of container 21 over to the cooler container 23, with the rotation as shown, so that when container 21 and container 23 have equal weights of fluid 25b and 25c therein, they are approximately in balance. The platform 19 and the containers continue to rotate as more liquid is boiled over, and this is shown in FIG. 3, where now there is little fluid 25d in container 2 l and most of the liquid has boiled over to container 23 (fluid 25e), as shown. The process continues until the right side of platform 19 hits shutter control means lever 31. When this occurs, the shutter control means is activated and door 15 is moved to the right to its second rest position as shown in FIG. 4. Here the process immediately reverses itself and the sunlight is closed from window 25 and now enters window 11 where it heats up container 23. The fluid 25g heats and partially boils over through tube 27 back into container 21, as condensed fluid 25f. In FIG. 5, the process continues as more solar energy (sunlight) heats container 23 and its contents, fluid 25i, wherein fluids 25h and 25i are about equal. In FIG. 6, most of the fluid 25j has boiled over to shuttered (shaded) container 21, with little fluid 25k remaining in container 23. Next, the excess weight of the left side would cause platform 19 to contact shutter control means lever 29, which causes door 15 to move right, opening window 9 and closing window 11 again as in FIG. 1. Then this reciprocating process described merely repeats itself. The actual mechanism of the levers 29 and 31 triggering door or shutter means movement is not critical to the process, as any know means will work. Such mechanisms include, but as not limited to pulleys, hydraulics, pneumatics, gears, linkages, power driven (motorized) with wires or wireless activation.

The fluids utilized may be any organic or inorganic fluids, including water. However, organic fluids, and especially low boiling point fluids, such as low carbon chain organic fluids and low boiling point alcohols, are preferred. Any fluids discussed in the present inventor's issued U.S. Pat. No. 4,079, 249, incorporated herein by reference, may be used, as well as any within the skill of the artisan, such as are used in published liquid-based solar tracking devices. U.S. Pat. No. 4,079,249, issued to Kenneth P. Glynn on Mar. 14, 1978 and entitled "Solar Energy Operated Motor Apparatus" is incorporated herein in its entirety.

The solar heat-receiving closed containers used herein are open to the connecting means to the opposite containers, but are otherwise closed to the atmosphere to prevent evaporative losses of the fluids therein. In some instances, depending upon the volatility of the fluid and the environment, it may be useful to provide and expansion chamber for the boiling gases, such as in the connecting tube. However, usually this will not be necessary, as actual reciprocating devices were built and functioned without the need for gas expansion accommodation. The containers may be made of one or a combination of materials and may be transparent, translucent or opaque. For example, metal containers may absorb solar heat well and transfer the heat to the fluids without any transparency whatsoever. Clear or translucent materials such as plastics or glass, may alternatively be used and these will allow sunlight to directly heat the fluids. Mirrors or other reflectors may be used inside or outside the roof or housing to increase the light hitting the containers. In some embodiments, transparent or translucent containers may have black bases to enhance heat absorption. Magnifying glasses may be strategically positioned to increase the amount of solar heat contacting the containers.

Figure 7:
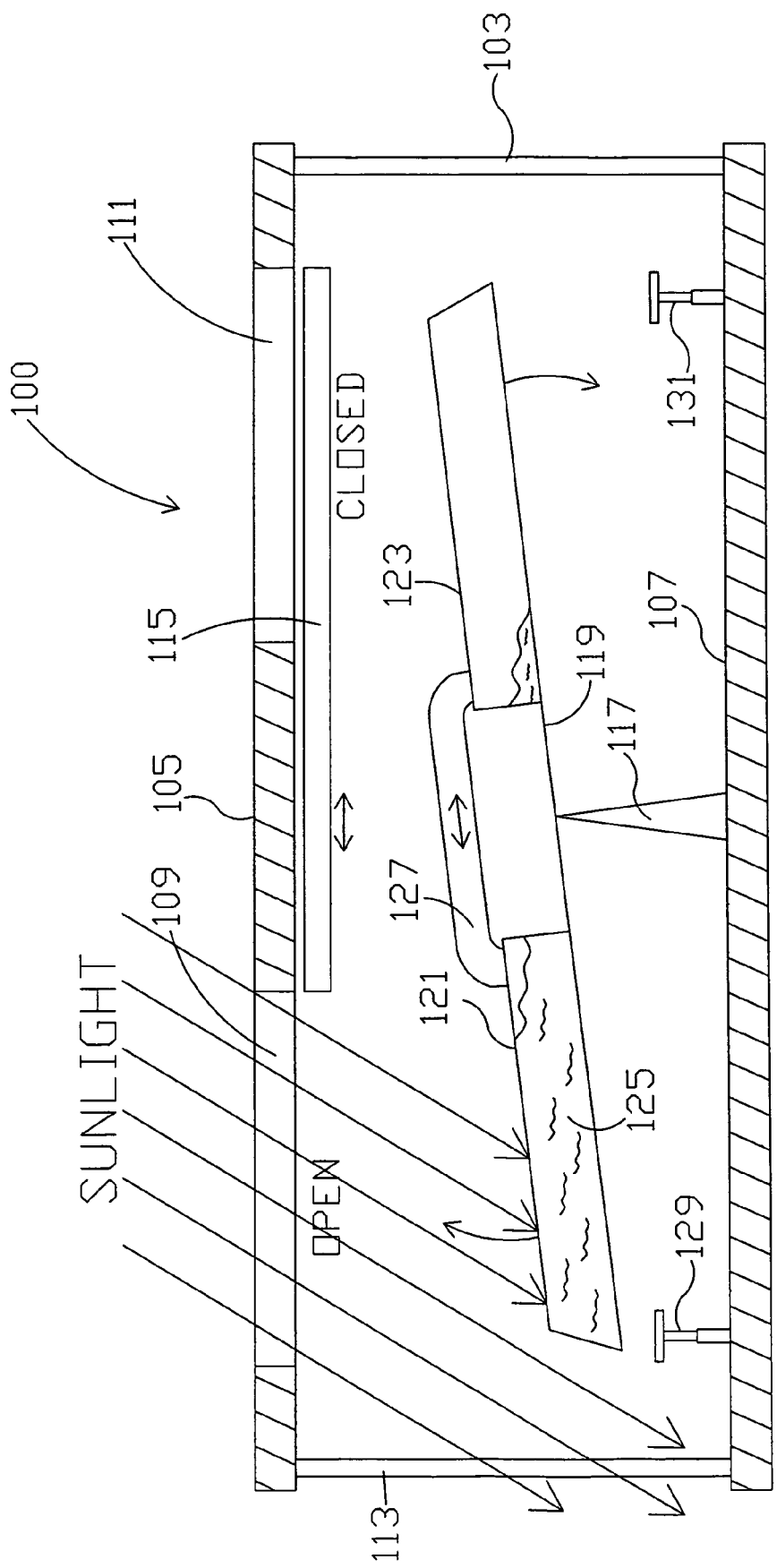
FIG. 7 is a side cut view of another preferred embodiment of a present invention reciprocating solar engine with a roof with open supports instead of closed walls.

FIG. 7 is a side cut view of another preferred embodiment of a present invention reciprocating solar engine 100 with a roof 105 with open supports, such as support posts 103 and 113, instead of closed walls. This enables air to freely flow about the containers. In some environments this is preferred to air cool the shaded containers, while in other environments, such as extreme wind, the closed housing is preferred to reduce heat losses at the heated container. Yet another alternative is a housing with ventilating openings, or vents that can be opened or closed, as needed. In FIG. 7, there is an optional base 107, windows 109 and 111 in roof 105, with a central large window shuttering door 115, a central fulcrum support 117 and a platform 119. Platform 119 has two opposing solar heat-receiving closed containers 121 and 123, connected by connecting tube 127. As shown, there is significant fluid 125 in container 121. There are also two shutter control levers 129 and 131. This engine 100 operates the same as the one shown in FIGS. 1 through 6 above.

Figure 8:
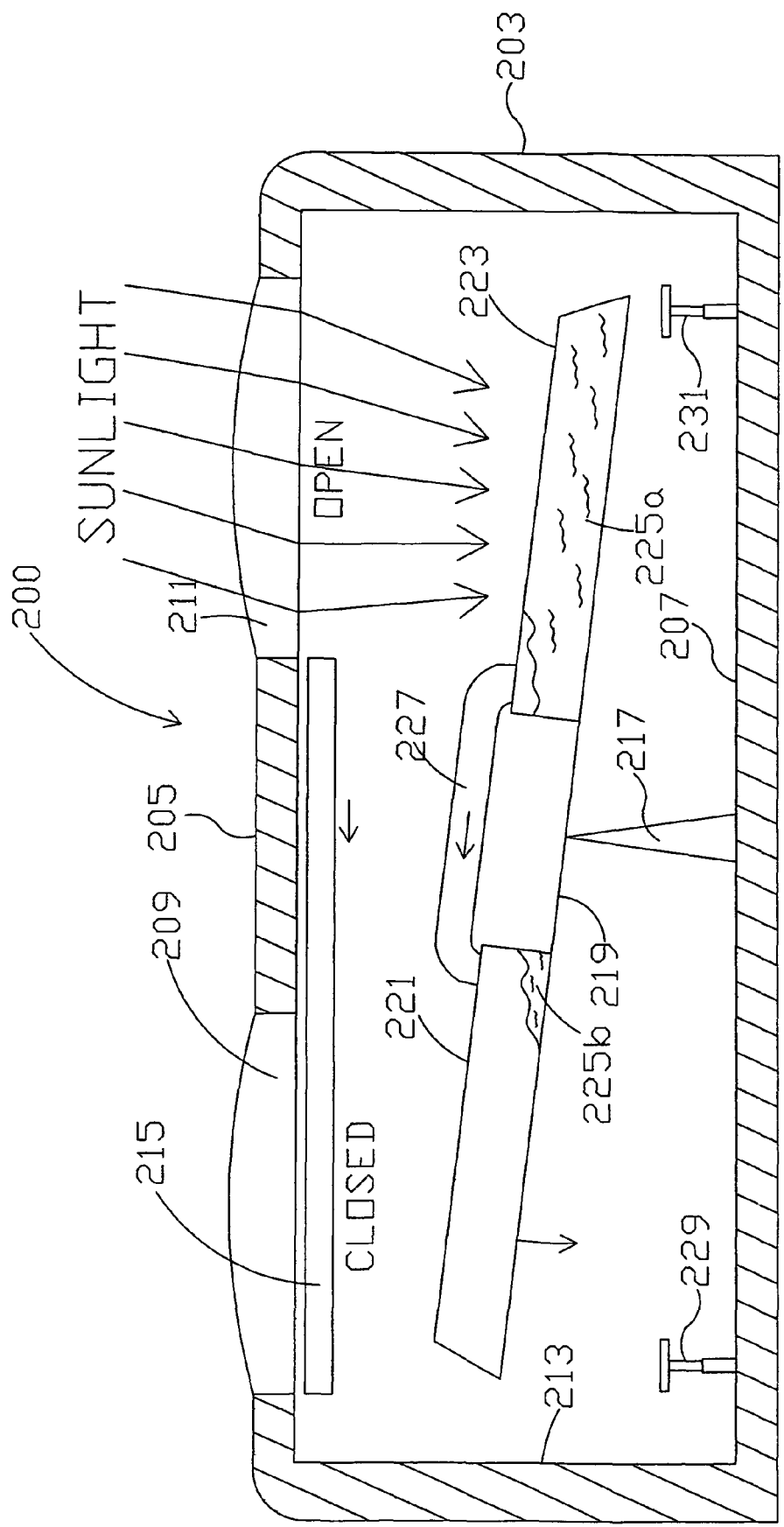
FIG. 8 is a side cut view of another preferred embodiment of a present invention reciprocating solar engine with a magnifying lens in each window to function as a solar energy concentrator.

FIG. 8 is a side cut view of another preferred embodiment of a present invention reciprocating solar engine 200 with a magnifying lenses 209 and 211 in each of the respective windows of roof 205, to function as solar energy concentrators. Housing 203 has a roof 205, side walls, such as side wall 213 and a bottom 207. Roof 205 has a central large window shuttering door 215, that keeps one window open and the other closed and versa. In FIG. 8, present invention reciprocating solar engine 200 also includes optional base 207, a central fulcrum support 217 and a platform 219. Platform 219 has two opposing solar heat-receiving closed containers 221 and 223, connected by connecting tube 227. As shown, there is significant fluid 225a in container 223 and a small amount of fluid 225b in container 221. There are also two shutter control levers 229 and 231. The lenses will provide more concentrated solar energy, as shown in the Figure, and, in some embodiments, allow for higher boiling point fluids in the container than might be uses without the concentrator lenses. Except for the concentration of solar heat caused by the lenses 209 and 211, to either provide higher temperatures, faster boiling or both, this engine 200 operates the same as the one shown in FIGS. 1 through 6 above.

Figure 9:
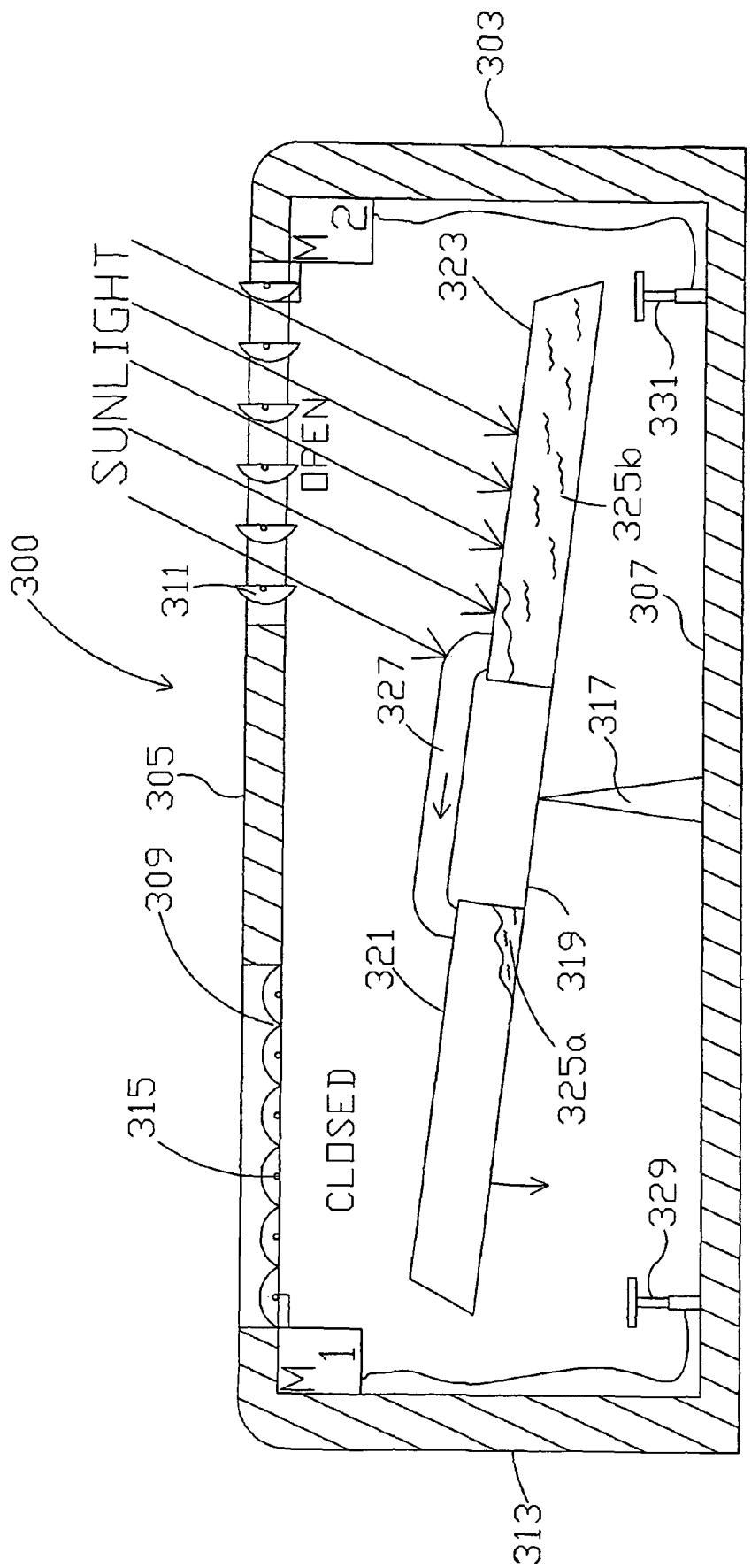
FIG. 9 is a side cut view of another preferred embodiment of a present invention reciprocating solar engine with sets of shutters or blinds to function as the window shutter means.

FIG. 9 is a side cut view of another preferred embodiment of a present invention reciprocating solar engine 300 with sets of shutters or blinds 315 and 335, respectively, for windows 309 and 311 of roof 305, to function as the window shutter means. One set is open when the other is closed and vice versa. They respond to the contact of the reciprocating platform 319 to shutter control means levers 329 and 331 via wires and responsive electric drive motors $M_1$ and $M_2$. (The details of motor driven blinds or shutters are not shown, as such are commercially available and well known, although not in the context of the present invention reciprocating solar engine windows. However, the same motors and drives, linkages and gears used in conventional motor driven blinds could be used here) in place of the motorized operation, the blinds could be operated by hydraulic connections, pneumatic connections, mechanical linkages, pulleys, pulleys and weights, counterweights, gears or any combination thereof, or any other drive means to cause responsive movement to the actuation of one lever 329 or the other lever 331. In FIG. 9, present invention reciprocating solar engine 300 includes housing 303, with roof 305 side walls such as side wall 313, and optional bottom 307, a central fulcrum support 317 and a platform 319. Platform 319 has two opposing solar heat-receiving closed containers 321 and 323, connected by connecting tube 327. As shown, there is significant fluid 225b in container 323 and a small amount of fluid 225a in container 321. There are also two shutter control levers 229 and 231. Except for the different choice of shutter means and shutter means controls, this engine 300 operates the same as the one shown in FIGS. 1 through 6 above.

Figure 10:
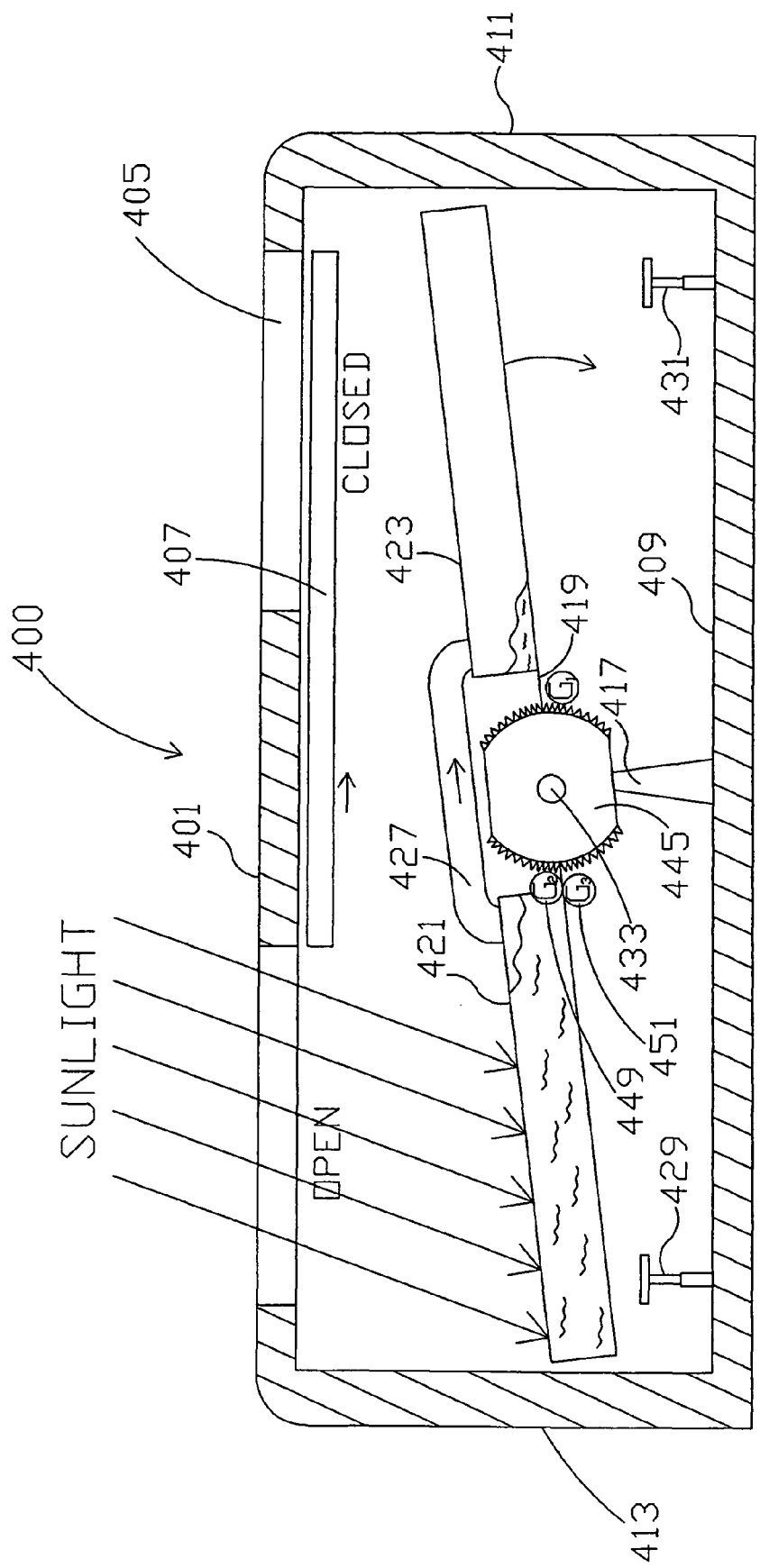
FIG. 10 is a side cut view of another preferred embodiment of a present invention reciprocating solar engine with the device as shown in FIG. 1 but with a gear driving shaft take-off connected to the reciprocating platform at its axis of rotation.

FIG. 10 is a side cut view of another preferred embodiment of a present invention reciprocating solar engine 400 with the device as shown in FIG. 1 but with a gear driving shaft take-off connected to the reciprocating platform 419 at its axis of rotation. Housing 411 has a roof 401, side walls, such as side wall 413, and a bottom 409. Roof 401 has windows 403 and 405, and a central large window shuttering door 215, that keeps one window open and the other closed and versa. In FIG. 10, present invention reciprocating solar engine 400 also includes a central fulcrum support 417 and a platform 419. Platform 419 has two opposing solar heat-receiving closed containers 421 and 423, connected by connecting tube 427. As shown, there is significant fluid in container 421 and a small amount of fluid in container 423. There are also two shutter control levers 429 and 431. This present invention engine 400 operates the same as the one shown in FIGS. 1 through 6 above. As the platform moves through its reciprocal motion as described in conjunction with FIGS. 1 through 6 above, main gear 445 rotates back and forth. When platform 419 is moving down on its right as shown by the arrow under container 423, main gear 445 rotates clockwise and it rotates gear 447 counterclockwise. Gear 447 has a take off drive to any desired operation, such as an electric generator. Gear 447 is a slip gear that will engage its takes off when gear 447 is moving counterclockwise and not when rotating clockwise, In essence, it only runs the generator in one direction (counterclockwise take off). Gear 449 works in the opposite fashion. When platform 419 is moving down on its left side, main gear 445 rotates counterclockwise and it rotates gear 449 clockwise. Gear 449 has a connecting gear 451 that rotates counterclockwise and is likewise connected to a take off drive to any desired operation, such as an electric generator. Gear 449 is a slip gear that will engage its connecting gear 451 when gear 449 is moving clockwise and not when rotating counterclockwise. In essence, it only runs the generator in one direction (counterclockwise take off from gear 451). Thus, in this embodiment, whether platform 419 is seesawing clockwise or counterclockwise, the generator will be driven and always in the same direction. Alternatively, a generator can be driven directly from the platform central axis of rotation and have a pole reversing mechanism so that no slip gear or other arrangement is necessary.

Figure 11:
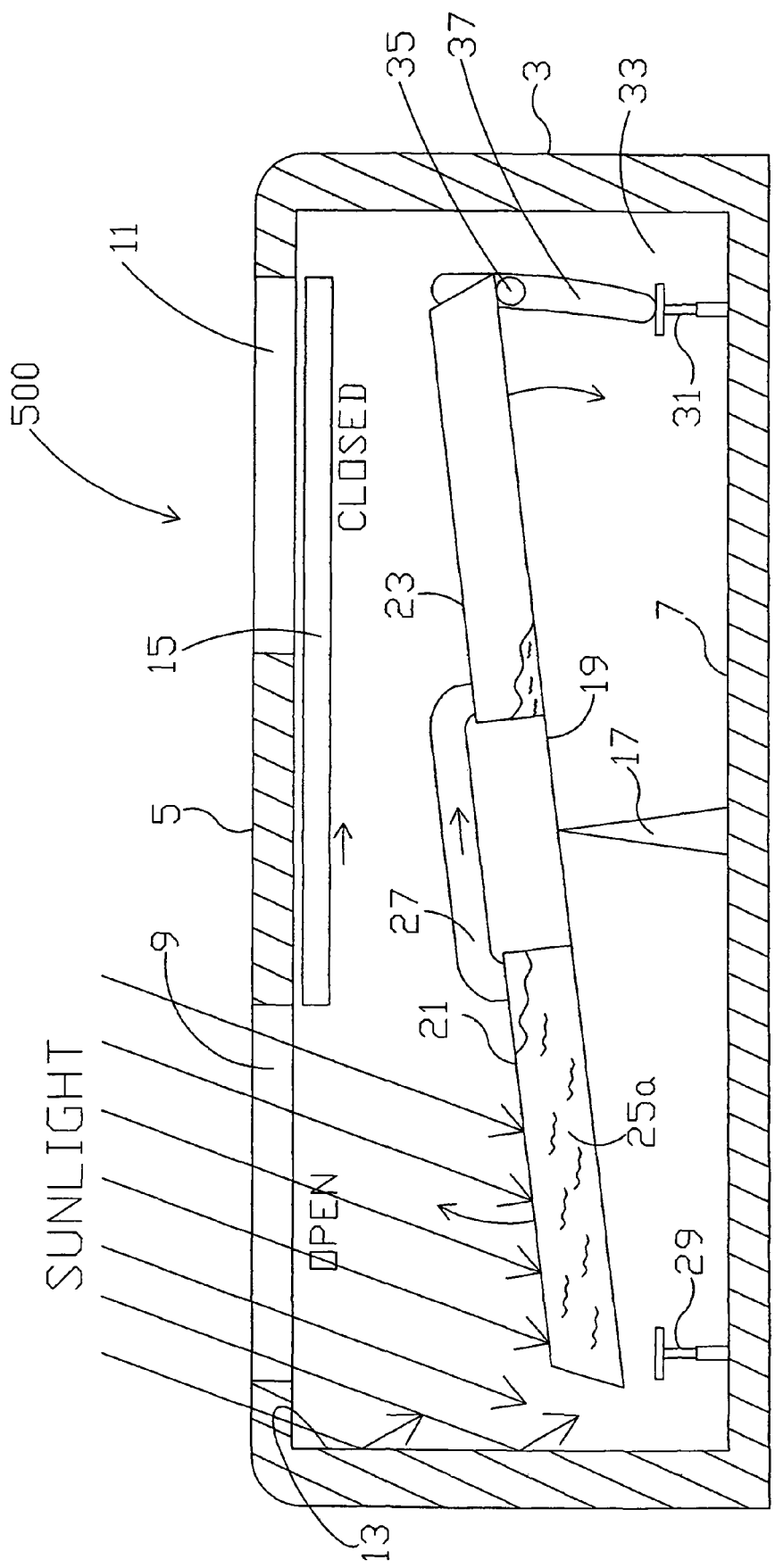
FIG. 11 is a side cut view of another preferred embodiment of a present invention reciprocating solar engine with the device as shown in FIG. 1 but with a reciprocating connector rod to the reciprocating platform away from its axis of rotation.

FIG. 11 is a side cut view of another preferred embodiment of a present invention reciprocating solar engine with the device 500. It is the same device shown in FIGS. 1 through 6 above as shown in FIG. 1, but with a reciprocating connector rod 35 connected to and moving with the reciprocating platform at a location away from its axis of rotation. Identical elements to the aforesaid Figures are identically numbered here and need not be repeated. There is an arcuate cut out 37 in the wall or walls of housing 3 so as to allow for connection to any reciprocating drive mechanism for any purpose. Thus, it can externally be used for compression, such as with a piston, or to drive a back and forth work function (such as some well pumps) or to be converted to circular motion (such as on steam locomotion train drives), as an end user may desire.

Figure 12:
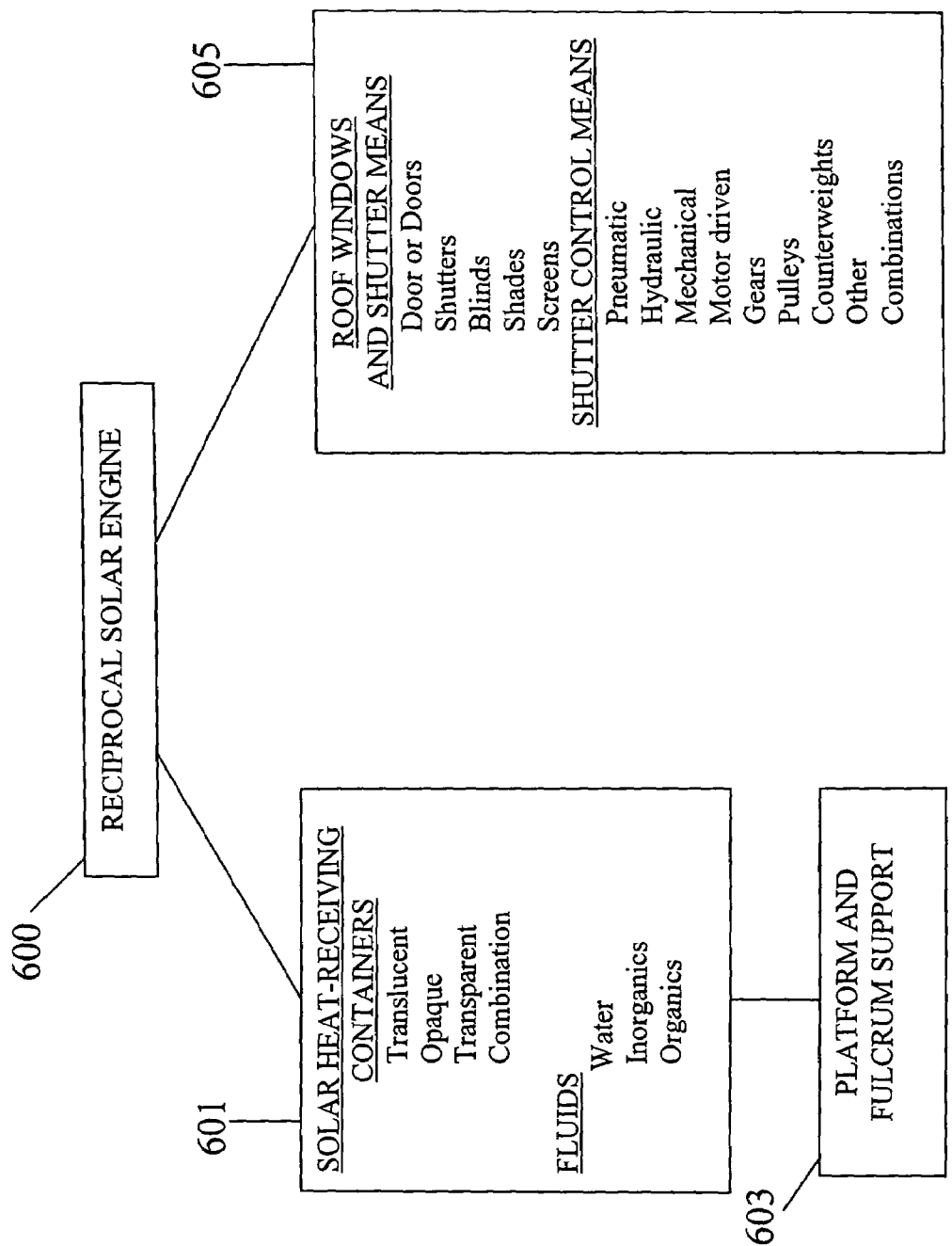
FIG. 12 is a block diagram illustrating various alternatives and options for some preferred embodiments of a present invention reciprocating solar engine.

FIG. 12 is a block diagram illustrating various alternatives and options for some preferred embodiments of a present invention reciprocating solar engine 600. Block 601 shows some preferred choices for containers in terms of light passage-transparent, opaque, translucent and combinations thereof. The fluids are described in more details above, but are both organics and inorganics, including water. Block 603 merely calls out the platform and fulcrum support. Any rotating mechanism may be used to rotatably nest or connect the platform to the fulcrum support, including hinges, axles, arcuated cradle and rod, shaft and receiver, and ball bearings and rod(s). Block 605 has both the roof shutter means and the some related controls listed.

Figure 13:
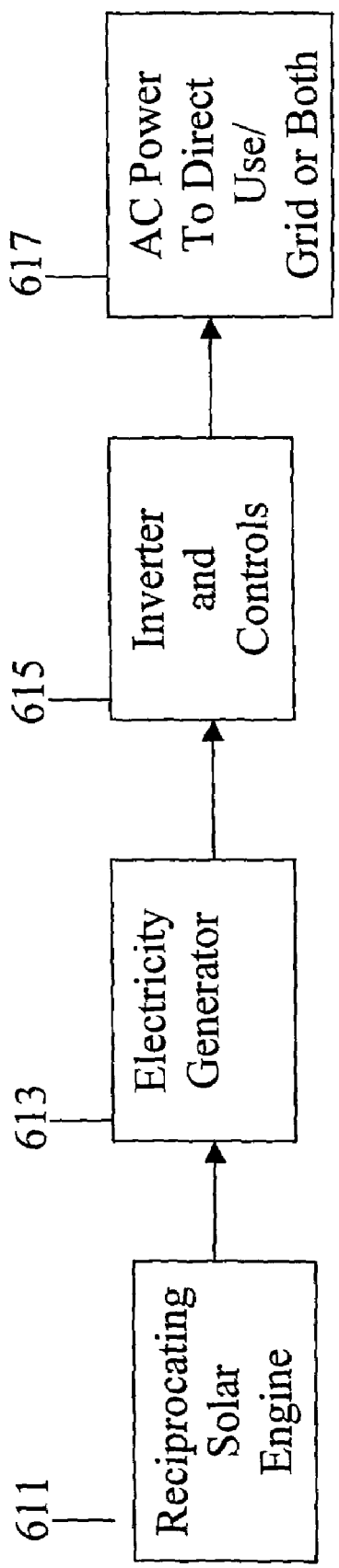
FIG. 13 is a block diagram illustrating one use for some preferred embodiments of a present invention reciprocating solar engine; and, FIG. 14 is a block diagram illustrating another use for some preferred embodiments of a present invention reciprocating solar engine.

FIG. 13 is a block diagram illustrating one use for some preferred embodiments of a present invention reciprocating solar engine 611 it is used to turn an electricity generator 613 that sends direct current to inverter/controls 615. This produces alternating current that may be fed back to an electricity grid for credits or may be used directly for AC needs, or both, block 617.

Figure 14:
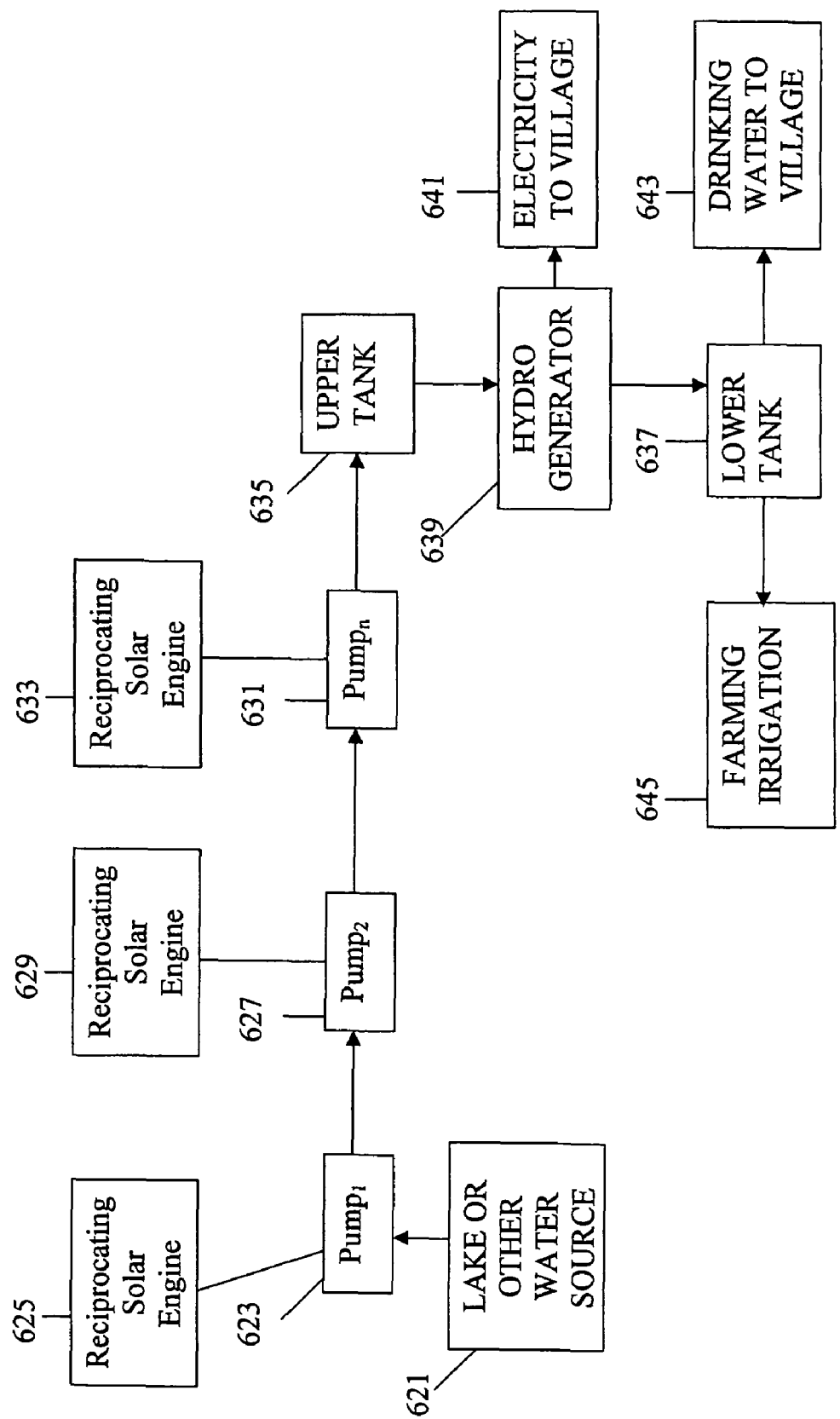

FIG. 14 is a block diagram illustrating another use for some preferred embodiments of a present invention using a series of reciprocating solar engines. Consider a homestead, a factory where hand made products are produced, or even a remote village, where water and electricity are lacking significantly or altogether. In this embodiment shown in FIG. 14, a lake or other water source, here, lake 621, is located some distance form the place in need of water and electric power. In this case, a series of present invention reciprocating solar engines may be used to pump water to the desired location. A series of present invention reciprocating solar engines 625, 629 and 633 are respectively connected to run pumps 623, 627 and 631 to pump water to a remotely located tower, upper tank 635. As many reciprocating solar engines (RSEs) and pumps as needed may be hooked up in series. The pumps may be reciprocating or rotary or otherwise, and the RSEs may be connected for direct drive or to generators with or without inverters to electrically operate the pumps. The water pumped to upper tank 635 is filled during sunlight and withdrawn to lower tank 637 over time, e. g., 24 hours a day, or periodically or intermittently, or on demand. As water flows downwardly from upper tank 635, it flows through a hydro power turbine generator 639 and then into lower tank 637, generating electricity to the needy village 641. Additionally, the water from lower tank 637 is available as drinking water to the village 643 and as farming irrigation water 645, or may be used for any other purpose as well.

To summarize, the present invention thus provides a device for generating engine power to create work or electricity without the need for expensive and inefficient solar panels or noisy towering wind turbines.

Although particular embodiments of the invention have been described in detail herein with reference to the accompanying drawings, it is to be understood that the invention is not limited to those particular embodiments, and that various changes and modifications may be effected therein by one skilled in the art without departing from the scope or spirit of the invention as defined in the appended claims. As examples, the drawings are shown with two windows, one left and one right. The present invention reciprocating solar engine roof could more than two or many windows without exceeding the present invention scope. The containers are, for simplicity of explanation, shown as one on each side of the fulcrum support on the platform. The present invention devices may employ a few or many connected containers and they may be connected in series, in parallel or as shown in U.S. Pat. No. 4,079,249, incorporated herein by reference.

What is claimed is:

1. A reciprocating solar engine, which comprises:
    a) a seesawing platform having a central fulcrum support upon which said platform is moveably positioned to reciprocally rotate via weight shifts, through a predetermined arc, said predetermined arc having a bottom, said bottom being the arc base;
    b) a first solar heat-receiving closed container located on said platform on a first side of said central fulcrum support and a second solar heat-receiving closed container located on said platform on a second side of said central fulcrum support and opposite said first side, each of said containers being positioned on said platform to reciprocally rotate through said predetermined arc with said platform;
    c) a connecting tube, connected to said first solar heat-receiving closed container and to said second solar heat-receiving closed container;
    d) a fluid contained within at least one of said first solar heat-receiving closed container and said second solar heat-receiving closed container, said fluid being evaporable from solar heat and condensable from shading from solar heat;
    e) a roof located above said platform, said roof having at least two windows, at least one window of which is located above said first solar heat-receiving closed container and at least one window of which is located above said second solar heat-receiving closed container;
    f) shutter means connected to said roof and movably related to said at least two windows and functionally connected thereto, said shutter means having a first rest position and a second rest position, wherein in said first rest position, said at least one window above said first solar heat-receiving closed container is open and said at least one window above second solar heat-receiving closed container is closed, and wherein in said second rest position, said at least one window above said first solar heat-receiving closed container is closed and said at least one window above second solar heat-receiving closed container is open, said shutter means being selected from the group consisting of a single sliding door, doors, shutters, screens and shades; and,
    g) shutter control means functionally connected to said shutter means and functionally connected to said platform such that said shutter control means activates said shutter to said first rest position when said second solar heat-receiving closed container is at its arc base, and to said second rest position when said first solar heat-receiving closed container is at its arc base.

2. The reciprocal solar engine of claim 1, wherein said reciprocal solar engine includes a housing with walls and said roof is a roof of said housing.

3. The reciprocal solar engine of claim 1 wherein roof is a rectangular shaped roof from a top view.

4. The reciprocal solar engine of claim 1, wherein said shutter controls means is selected from the group consisting of motor drive control means, mechanical control means, hydraulic control means and pneumatic control means.

5. The reciprocal solar engine of claim 1, wherein said first solar heat-receiving closed container and said second solar heat-receiving closed container are at least partially transparent containers.

6. The reciprocal solar engine of claim 5, wherein said at least partially transparent containers have transparent tops and solar heat-absorbing bottoms.

7. The reciprocal solar engine of claim 1, wherein said first solar heat-receiving closed container and said second solar heat-receiving closed container are selected from the group consisting of glass, metal, plastic, and combinations thereof.

8. The reciprocal solar engine of claim 1, wherein said reciprocal solar engine includes a connecting member for transfer of motive power, connected to at least one of said platform and a container.

9. The reciprocal solar engine of claim 8, wherein said connecting member is a shaft connected to said platform proximate its center and on its axis of rotation to function as an arcuate reciprocating drive shaft.

10. The reciprocal solar engine of claim 1, wherein said at least two windows contain solar energy concentrating magnifying lenses.

11. The reciprocating solar engine of claim 1 wherein said shutter means is at least one sliding door.

12. The reciprocal solar engine of claim 11, wherein said reciprocal solar engine includes a housing with walls and said roof is a roof of said housing.

13. The reciprocal solar engine of claim 11, wherein said shutter controls means is selected from the group consisting of motor drive control means, mechanical control means, hydraulic control means and pneumatic control means.

14. The reciprocal solar engine of claim 11, wherein said first solar heat-receiving closed container and said second solar heat-receiving closed container are at least partially transparent containers with transparent tops and solar heat-absorbing bottoms.

15. The reciprocal solar engine of claim 11, wherein said reciprocal solar engine includes a connecting member for transfer of motive power, connected to at least one of said platform and a container.

16. The reciprocal solar engine of claim 11, wherein said at least two windows contain solar energy concentrating magnifying lenses.

17. The reciprocal solar engine of claim 1 wherein said shutter means is a plurality of shutters.

* * * * *